(12) United States Patent
Wang et al.

(10) Patent No.: US 8,351,922 B2
(45) Date of Patent: Jan. 8, 2013

(54) METHOD AND APPARATUS FOR LTE RADIO LINK FAILURE DETERMINATION IN DRX MODE

(75) Inventors: Peter S. Wang, East Setauket, NY (US); Ulises Olvera-Hernandez, Kirkland (CA); Paul Marinier, Brossard (CA); Jean-Louis Gauvreau, La Prairie (CA); Guodong Zhang, Syosset, NY (US); Shankar Somasundaram, London (GB)

(73) Assignee: Interdigital Patent Holdings, Inc., Wilmington, DE (US)

( * ) Notice: Subject to any disclaimer, the term of this patent is extended or adjusted under 35 U.S.C. 154(b) by 284 days.

(21) Appl. No.: 12/564,177

(22) Filed: Sep. 22, 2009

(65) Prior Publication Data
US 2010/0113008 A1 May 6, 2010

Related U.S. Application Data

(60) Provisional application No. 61/099,040, filed on Sep. 22, 2008, provisional application No. 61/110,838, filed on Nov. 3, 2008.

(51) Int. Cl.
*H04W 24/00* (2009.01)
(52) U.S. Cl. ........ 455/423; 455/436; 455/450; 455/509; 370/319; 370/331; 370/335
(58) Field of Classification Search .................. 455/436, 455/450, 423, 509; 370/331, 319, 335
See application file for complete search history.

(56) References Cited

U.S. PATENT DOCUMENTS

| | | | |
|---|---|---|---|
| 2005/0281222 A1 | 12/2005 | Ranta-Aho et al. | |
| 2008/0261596 A1* | 10/2008 | Khetawat et al. | 455/436 |
| 2008/0268845 A1* | 10/2008 | Wu et al. | 455/436 |
| 2009/0023448 A1* | 1/2009 | Attar et al. | 455/436 |
| 2009/0029706 A1* | 1/2009 | Prakash et al. | 455/436 |
| 2010/0113023 A1* | 5/2010 | Huang et al. | 455/436 |
| 2010/0120429 A1* | 5/2010 | Kazmi et al. | 455/436 |
| 2010/0142485 A1* | 6/2010 | Lee et al. | 370/331 |
| 2010/0317345 A1* | 12/2010 | Futaki et al. | 455/436 |

OTHER PUBLICATIONS

3GPP ETSI TS 136 300 V8.1.0 (Jun. 2007) Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8).*
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.6.0 (May 2009).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.0.0 (May 2009).

(Continued)

*Primary Examiner* — Joseph Arevalo
(74) *Attorney, Agent, or Firm* — Condo Roccia LLP

(57) ABSTRACT

A method and apparatus for detecting radio link failure (RLF) in a wireless transmit receive unit (WTRU) includes the WTRU performing a series of radio link measurements during a discontinuous reception (DRX) on-duration, comparing each of the series of radio link measurements to a threshold, and determining that the series of radio link measurements indicates an out-of-synch condition.

16 Claims, 8 Drawing Sheets

OTHER PUBLICATIONS

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).

European Telecommunications Standards Institute (ETSI), TS 125 214 V7.9.0, "Universal Mobile Telecommunications System (UMTS); Physical layer procedures (FDD) (3GPP TS 25.214 version 7.9.0 Release 7)", Jul. 2008, 87 pages.

European Telecommunications Standards Institute (ETSI), TS 125 331 V8.3.0, "Universal Mobile TelecommunicationsSystem (UMTS); Radio Resource Control (RRC) ; Protocol specification (3GPP TS 25.331 version 8.3.0 Release 8)", Jul. 2008, 1495 pages.

* cited by examiner

METHOD AND APPARATUS FOR LTE RADIO LINK FAILURE DETERMINATION IN DRX MODE

CROSS REFERENCE TO RELATED APPLICATION

This application claims the benefit of U.S. provisional application Nos. 61/099,040, filed Sep. 22, 2008 and 61/110,838 filed Nov. 3, 2008, each of which is incorporated by reference as if fully set forth.

FIELD OF INVENTION

This application is related to wireless communications.

BACKGROUND

The Third Generation Partnership Project (3GPP) has initiated the Long Term Evolution (LTE) program to bring new technology, new network architecture, new configurations and new applications and services to wireless networks in order to provide improved spectral efficiency and faster user experiences.

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104 that includes a Mobility Management Entity (MME) 108 and a Serving Gateway (S-GW) 110.

FIG. 2 shows an LTE user-plane protocol stack 200 in accordance with the prior art. The protocol stack 200 is located in a wireless transmit receive unit (WTRU) 210 and includes the packet data control protocol (PDCP) 202, the radio link control (RLC) 204, the medium access control (MAC) 206 and the physical layer (PHY) 208. The protocol stack 200 may also reside in an eNB (not shown).

FIG. 3 shows an LTE control plane protocol stack 300 of the WTRU 210 of FIG. 2. The control plane protocol stack 300 includes the non-access stratum (NAS) 302 and a radio resource control (RRC) 304. Also included are the PDCP 306, RLC 308 and MAC 310, which together form the layer 2 sublayer 312.

Malfunction and dysfunction of the radio link, that is, the link between the WTRU and the eNB, may occur due to various reasons such as shielding, fading, interference or other mishaps due to mobility, for example. Rapid detection of a radio link failure (RLF) is important in order to initiate radio link or WTRU recovery procedures in a timely manner. Typically, RLF detection comprises downlink signal measurement performed by the physical layer entity combined with event filtering, so the WTRU may determine a course of action to follow after the problem is detected.

While performing downlink measurements, the physical layer (PHY) entity (Layer 1) of the WTRU may be configured to indicate a measurement result of "out-of-sync" or "in-sync" to the RRC entity. The WTRU is configured to count the number of out-of-sync results. The number of out-of-sync results could be counted in a counter, such as counter N310, for example. When the RRC entity counts a particular number of out-of-sync results, the RRC entity within the WTRU is configured to start a timer. For example, the WTRU may start a timer designated as the T310 timer. If the T310 timer expires prior to being stopped for another reason, the WTRU is configured to determine that an RLF has occurred.

FIG. 4 shows a discontinuous reception (DRX) cycle 400 in accordance with the prior art. Connected state DRX was introduced for LTE compliant WTRUs and eNBs for power saving purposes, in particular to conserve the battery of the WTRU. When a WTRU is in connected state DRX mode, it may "shut down" for period of time and use less power. As shown in FIG. 4, during a DRX cycle (402, 404, 406) a WTRU is able to transmit and receive during an on-duration (408, 410, 412) and does not transmit or receive during a sleep time (414, 416, 418). An eNB may be synchronized with the WTRU's DRX cycle, so that it does not send or expect to receive transmissions while the WTRU is in a sleep time.

Three parameters may be used by the WTRU and eNB to define the WTRU's DRX cycle. DRX on/off, DRX period and a non-DRX timer may be assigned values that network components can use to determine a WTRU's DRX cycle.

An LTE compliant WTRU may also be configured to operate in multiple states, where each state defines how the WTRU may be functioning in general terms. The RRC_connected state is one of the set of predefined states that a WTRU may function in. While in RRC_connected state, the WTRU may also be configured to operate in DRX mode.

When a WTRU is configured by the network to operate in DRX mode while in the RRC_connected state, the WTRU may be configured not to perform downlink measurements for RLF during the sleep time portion of the DRX cycle. The WTRU may be configured to perform the downlink radio signal measurement with respect to RLF only during the DRX on-duration and the active period.

SUMMARY

Disclosed is a method and apparatus for detecting a radio link failure (RLF) in a WTRU. This may include the WTRU performing a series of radio link measurements during a discontinuous reception (DRX) on-duration, comparing each of the series of radio link measurements to a threshold, and determining that the series of radio link measurements indicates an out-of-synch condition. The WTRU may also start a timer and continue the series of radio link measurements during a DRX sleep-time. The WTRU may also determine that the timer has expired and stop the series of radio link measurements.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
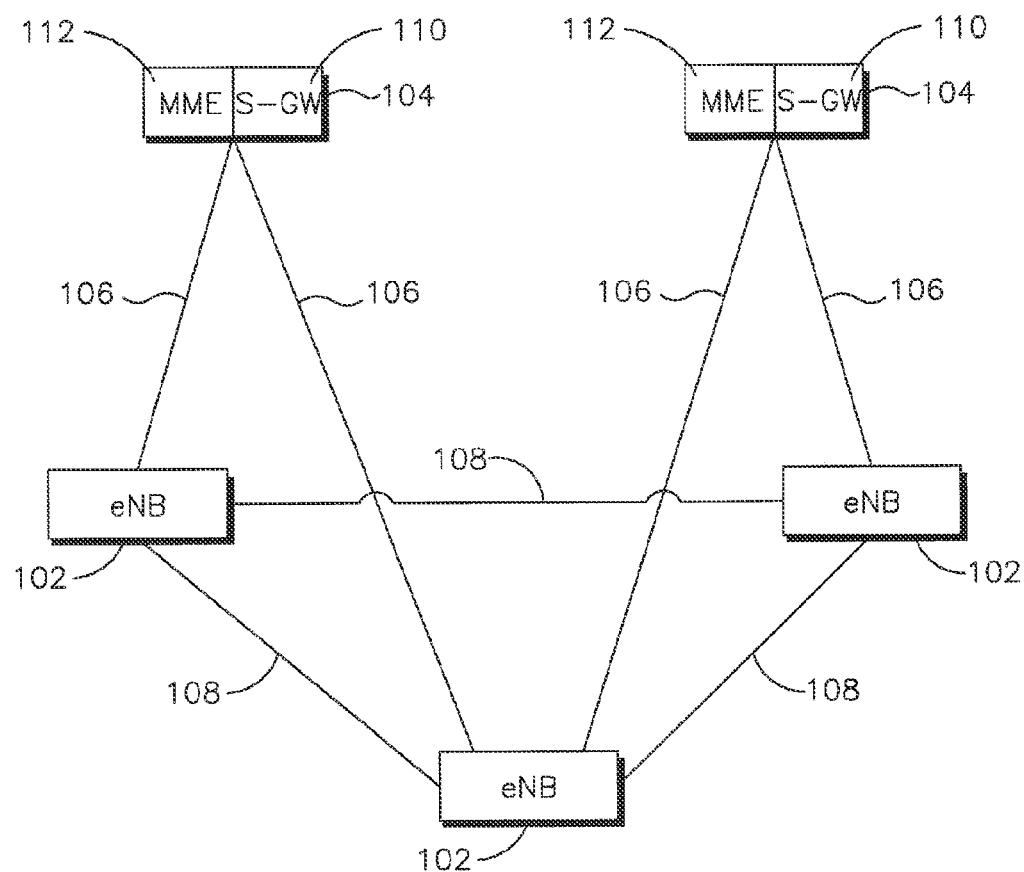
FIG. 1 shows an overview of an Evolved Universal Mobile Telecommunications System (UMTS) Terrestrial Radio Access Network (E-UTRAN) 100 in accordance with the prior art.
Figure 2:
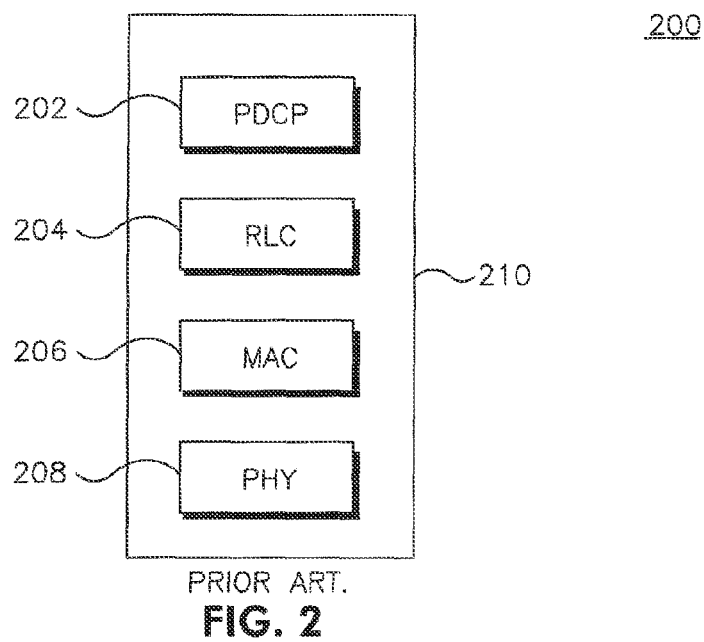
FIG. 2 shows an LTE user-plane protocol stack 200 in accordance with the prior art.
Figure 3:
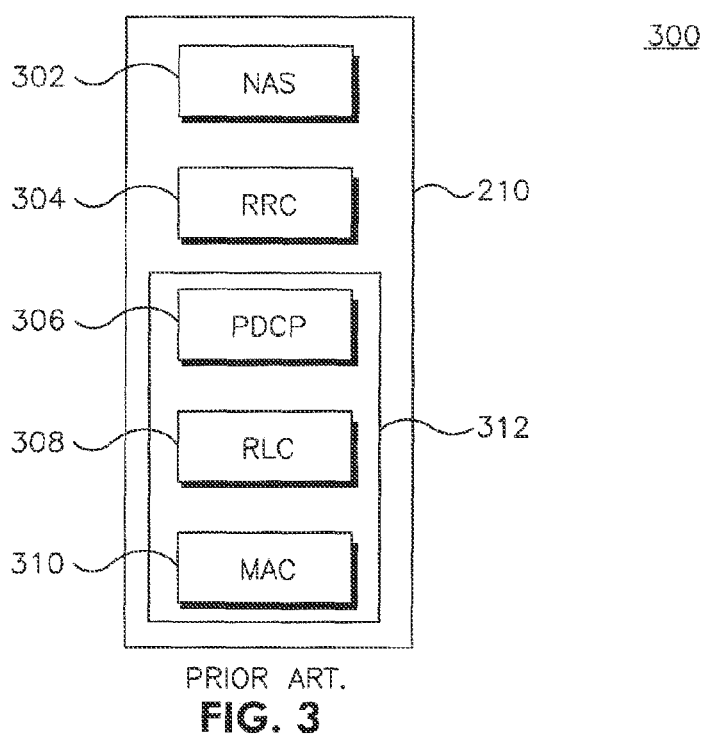
FIG. 3 shows an LTE control plane protocol stack 300 of the WTRU 210 of FIG. 2.
Figure 4:
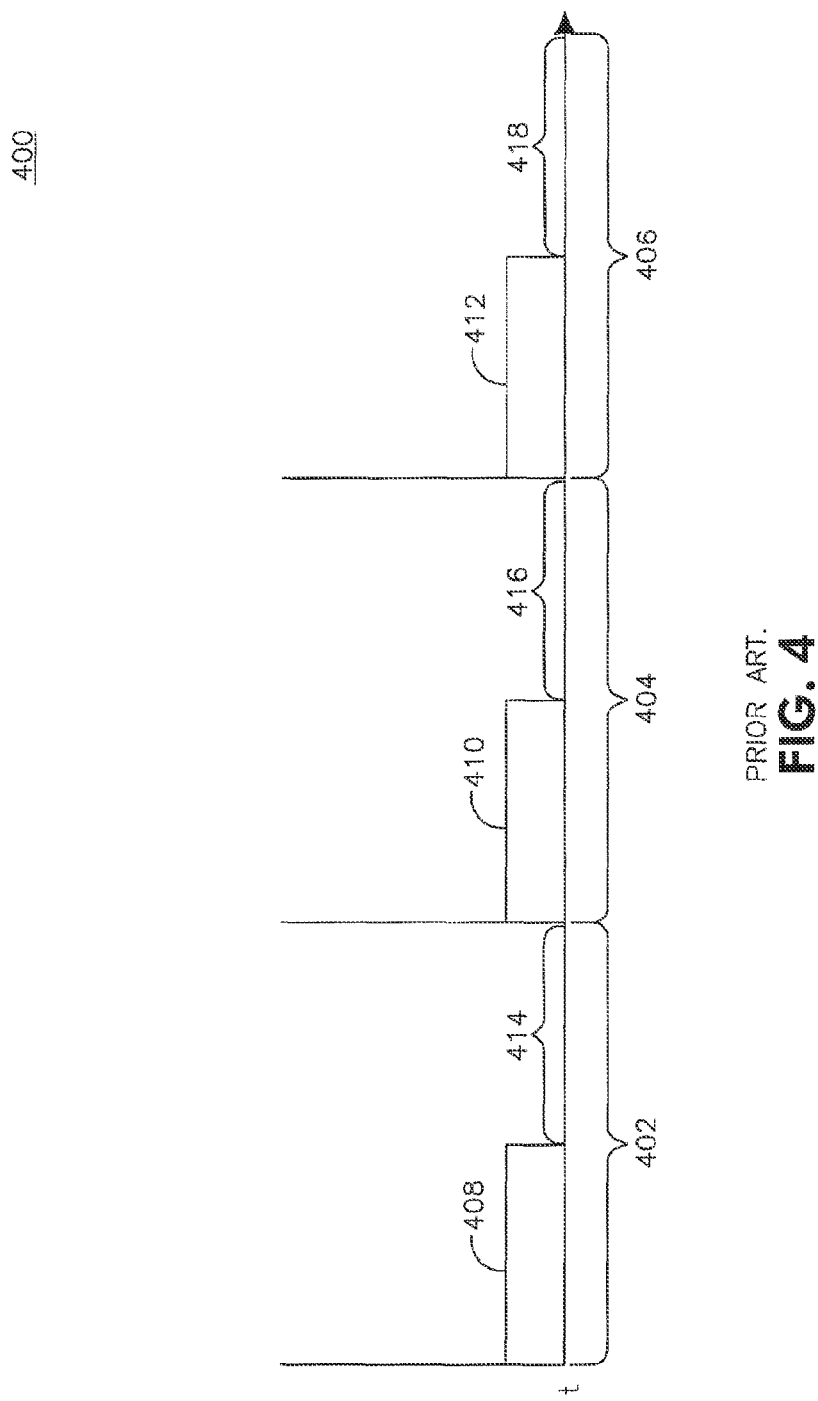
FIG. 4 shows a DRX cycle for a WTRU in accordance with the prior art.
Figure 5:
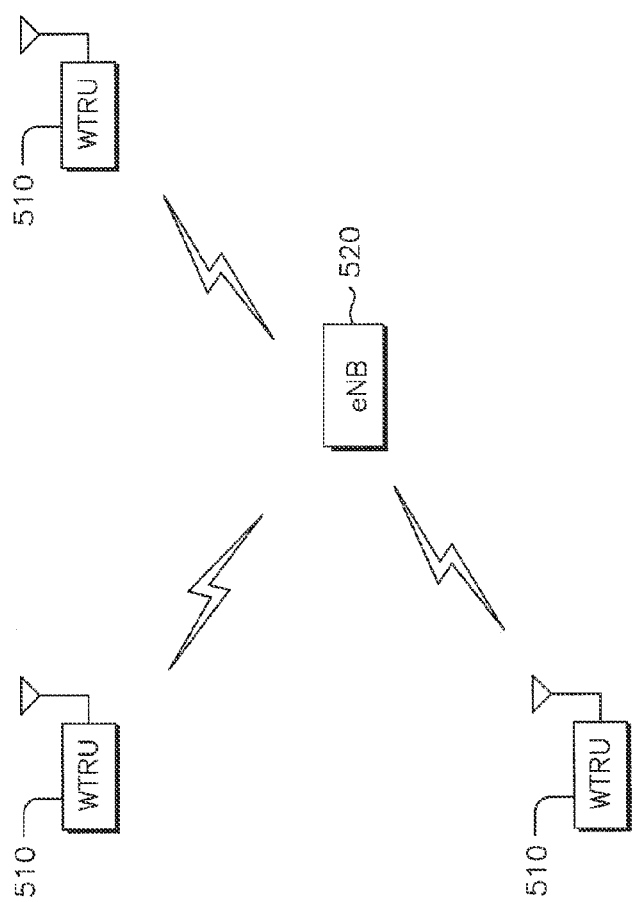
FIG. 5 shows an example wireless communication system including a plurality of WTRUs and an eNB.

FIG. 5 shows a wireless communication system 500 including a plurality of WTRUs 510, an eNB 520. As shown in FIG. 5, the WTRUs 510 are in communication with the eNB 520, which could be in communication with one another as shown in FIG. 1. Although three WTRUs 510 and one eNB 520 are shown in FIG. 5, it should be noted that any combination of wireless and wired devices may be included in the wireless communication system 500.

Figure 6:
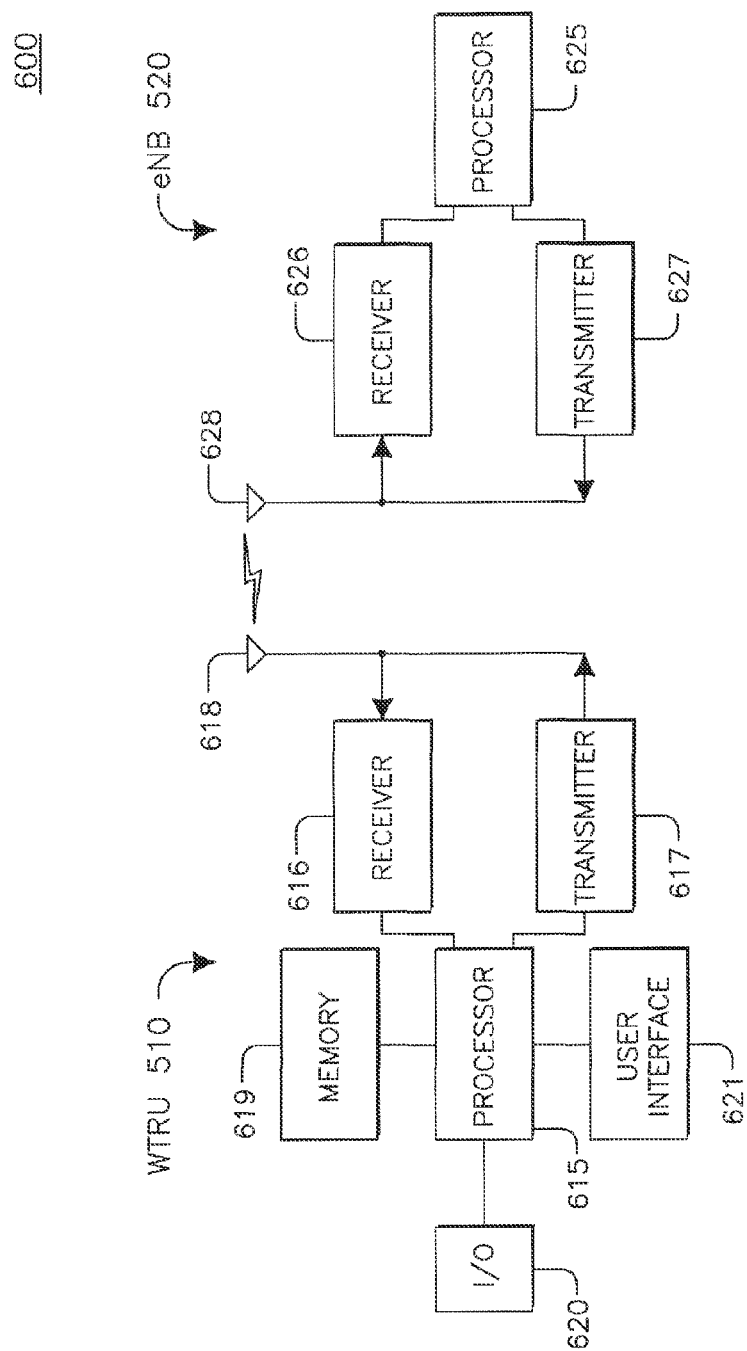
FIG. 6 is a functional block diagram of a WTRU and the eNB of FIG. 2.

FIG. 6 is a functional block diagram 600 of a WTRU 510 and the eNB 520 of the wireless communication system 500 of FIG. 5. As shown in FIG. 6, the WTRU 510 is in communication with the eNB 520. The WTRU is configured to function in DRX mode or non-DRX mode. The WTRU may also function in RRC_connected state or RRC-Idle state. The WTRU may be configured to perform methods for RLF determination in DRX mode and non-DRX mode.

In addition to the components that may be found in a typical WTRU, the WTRU 510 includes a processor 615, a receiver 616, a transmitter 617, and an antenna 618. The processor 615 is configured to perform methods for RLF determination in RRC_connected state and DRX mode. The receiver 616 and the transmitter 617 are in communication with the processor 615. The antenna 618 is in communication with both the receiver 616 and the transmitter 617 to facilitate the transmission and reception of wireless data.

In addition to the components that may be found in a typical base station, the eNB 520 includes a processor 625, a receiver 626, a transmitter 627, and an antenna 628. The processor 625 is configured to perform methods for RLF determination in RRC_connected state and DRX mode. The receiver 626 and the transmitter 627 are in communication with the processor 625. The antenna 628 is in communication with both the receiver 626 and the transmitter 627 to facilitate the transmission and reception of wireless data.

Figure 7:
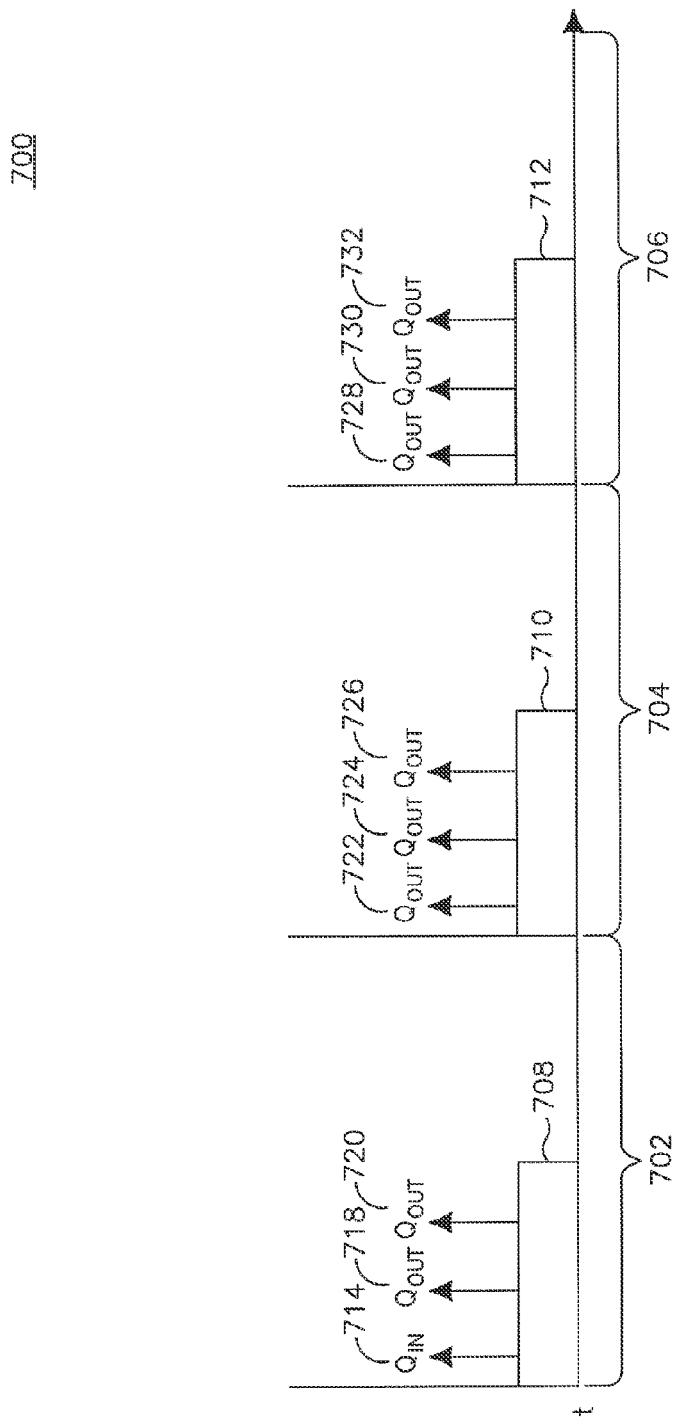
FIG. 7 shows a method to determine RLF in accordance with an embodiment.

FIG. 7 shows a method to determine RLF 700 in accordance with an embodiment. Each DRX cycle (702,704,706) includes an on-duration (708,710, 712). Measurement (714-732) may be taken during each on-duration (708,710, 712). Each measurement (714-732) is compared to thresholds Qin and Qout. Qin is a threshold for in synch operation, and is defined as a level at which downlink radio quality can be significantly more reliably received than that at the out of sync threshold (Qout). Qout is the out of synch threshold and is defined as the level at which the downlink radio link cannot be reliably received. The RLF evaluation may be based on the number of Qin and Qout results taken by the PHY entity and transmitted to higher layer entities.

As shown in FIG. 7, during a first on-duration 708, a first measurement 714 passed the in-synch (Qin) threshold while the second measurement 718 and third measurement 720 did not reach the out-of synch (Qout) threshold. This results in an out-of-synch determination for the first DRX cycle 702. In the second DRX cycle 704, during the second on-duration 710, the first measurement 722, second measurement 724 and third measurement 726 each resulted in an out-of-synch determination. In the third DRX cycle 706, during the third on-duration 712, the first measurement 728, second measurement 730 and third measurement 732 each resulted in an out-of-synch determination.

In FIG. 7, the WTRU is operating in DRX mode in RRC_connected state. RLF evaluation may be based on the measured status of a predetermined number of consecutive DRX on-durations ($N_{RLF-durations}$), rather than evaluating the measurements over a longer, continuous time period. As shown in FIG. 7, $N_{RLF-durations}$ equals three (3), and the RLF analysis may depend on the measured results of the first DRX cycle 702, which is out-of-synch, the second DRX cycle 704, which is also out-of-synch, and the third DRX cycle 706, which is also out of synch.

$N_{RLF-durations}$ may be determined based on a number of criteria. For example, $N_{RLF-durations}$ may be a fixed number that is preconfigured in the WTRU or signaled by the network. $N_{RLF-durations}$ may also be the value of a counter, such as N313 for example, or the value of the counter divided by an integer M, where M is a timer value divided by on-duration. $N_{RLF-durations}$ may also be a function of the length of a timer, such at timer T310, the length of the signaled on-duration time as computed by the WTRU, such as $N_{RLF-durations}$= (T310/on-duration period), or a function of the DRX cycle length, for example, the medium access control (MAC) DRX cycle, the long DRX-cycle and the short DRX-cycle, optionally including the length of the on-duration timer.

The on-duration timer length may be configured by the network and transmitted to the WTRU. The on-duration timer length may also be computed by the WTRU. The length of the DRX cycle and the number of consecutive on-duration measurements used to compute RLF may be inversely proportional. Optionally $N_{RLF-durations}$ may equal (configured DRX-length)/(shortest configurable DRX-length). As another option, $N_{RLF-durations}$ may equal the DRX-length/W, where W is a network configured or preconfigured integer.

Again referring to FIG. 7, at each on-duration period of each DRX cycle (708,710,712) higher layer entities in the WTRU may receive the measured RLF values from the (PHY) entity. The PHY entity may evaluate and determine, on a per DRX cycle basis, if the WTRU is in-synch or out-of-synch with the network. The PHY entity may then send a message to the higher layers, such as the MAC layer entity, radio resource control (RRC) layer entity, or radio link control (RLC) layer entity, that specifies "in-synch" or "out-of-sync", without passing the measurement data. The PHY entity will transmit the in-synch or out-of-synch condition by determining if, over the measurement period, there are a majority of in-synch measurements or out-of-synch measurements. If there is the same number of each measurement, the last returned measurement is used to determine whether the out of synch or in synch condition is passed to the higher layers.

Referring again to FIG. 7, the PHY entity may determine that, for the first DRX cycle 702, an out-of-synch condition should be transmitted to the higher layers, as there are two out-of-synch measurements (718, 720) and only one in-synch measurement (714). Similarly, for the second DRX cycle 704 and the third DRX cycle 706, the PHY entity would transmit an indication of an out-of-synch condition, as all the measurements in each cycle are out-of-synch.

The WTRU may be configured to determine that an RLF condition exists only when all $N_{RLF\text{-}durations}$ on-durations, or the DRX cycles containing the on-duration, measure as out-of-sync. The RRC may be configured to treat the WTRU in DRX mode in the same way as if a timer, such as the T310 timer, had expired and the WTRU was in non-DRX mode.

When the WTRU is in DRX mode, RLF measurements may be discontinuous, due to the nature of DRX operation. For a WTRU in DRX mode, the PHY layer entity may be configured to implicitly use different Qout and Qin thresholds than when the WTRU in non-DRX mode. For example, if the WTRU is in DRX mode, the PHY layer entity may apply an offset to the threshold values that the WTRU may use in non-DRX mode. This offset may lower the threshold values for Qout and Qin. A lower Qout threshold means that a lower measured value would be required to declare an out-of-synch condition in DRX mode than in non-DRX mode. A lower Qin threshold means it is easier in DRX mode to meet the in-synch measurement value than in non-DRX mode. Therefore, in DRX mode, the requirements for reaching an in-synch condition are more relaxed that in non-DRX mode.

The WTRU may make another adjustment during DRX mode in its determination of RLF conditions. During DRX mode, the PHY entity may be configured to reduce its filtering time from the non-DRX mode time to the length of the on-duration time, or shorter, if the on-duration time is shorter than the non-DRX filtering timer. For example, if the non-DRX filtering time is 200 ms, in DRX mode the WTRU may use a time shorter than 200 ms. The adjustment may be made by the WTRU based on an offset, by a fraction or value that is signaled from the network or predefined. The shorter filtering time in DRX mode should be sufficient for the WTRU to take measurements and check the downlink radio link quality of the serving cell.

Alternatively, while in DRX mode, the PHY entity may be configured to monitor every radio frame to check and measure downlink radio quality during the on-duration intervals only, as measured over a number (m) of DRX periods against thresholds (Qout and Qin). The number m is a parameter signaled by the network or derived by the WTRU based on the channel conditions. In the event that the on-duration is less than a frame, the WTRU may be configured to evaluate link quality over the on-duration interval only.

In another embodiment, during each DRX cycle, measurements are taken during the on-duration. The WTRU may continue measuring past each on-duration boundary and into the sleep time portion of the DRX cycle. This may occur when a single or small preconfigured number of consecutive Qout measurements are detected. The WTRU may also continue measuring during the sleep time if an average value of all measurements taken during the on-duration is below the out-of-sync threshold, until either a set number of consecutive Qin is measured or the RLF is declared The DRX logic of data reception may remain unchanged.

The WTRU may be configured such that once the set number of consecutive Qout is detected, the RLF measurement operation continues into the sleep time as if the WTRU is operating in the non-DRX mode. Therefore the non-DRX RLF detection criteria, for example, using a network configured time such as the RLF recovery timer T310 to gauge the RLF determination, may be used, even though the WTRU is in DRX mode. If, however, before or when the length of evaluation period is completed, for example, 200 ms, and if the in-synch condition is met, for example, a set number of consecutive Qin are detected, the RLF measurement may be stopped for the inactive portion of time of the DRX cycle.

Figure 8:
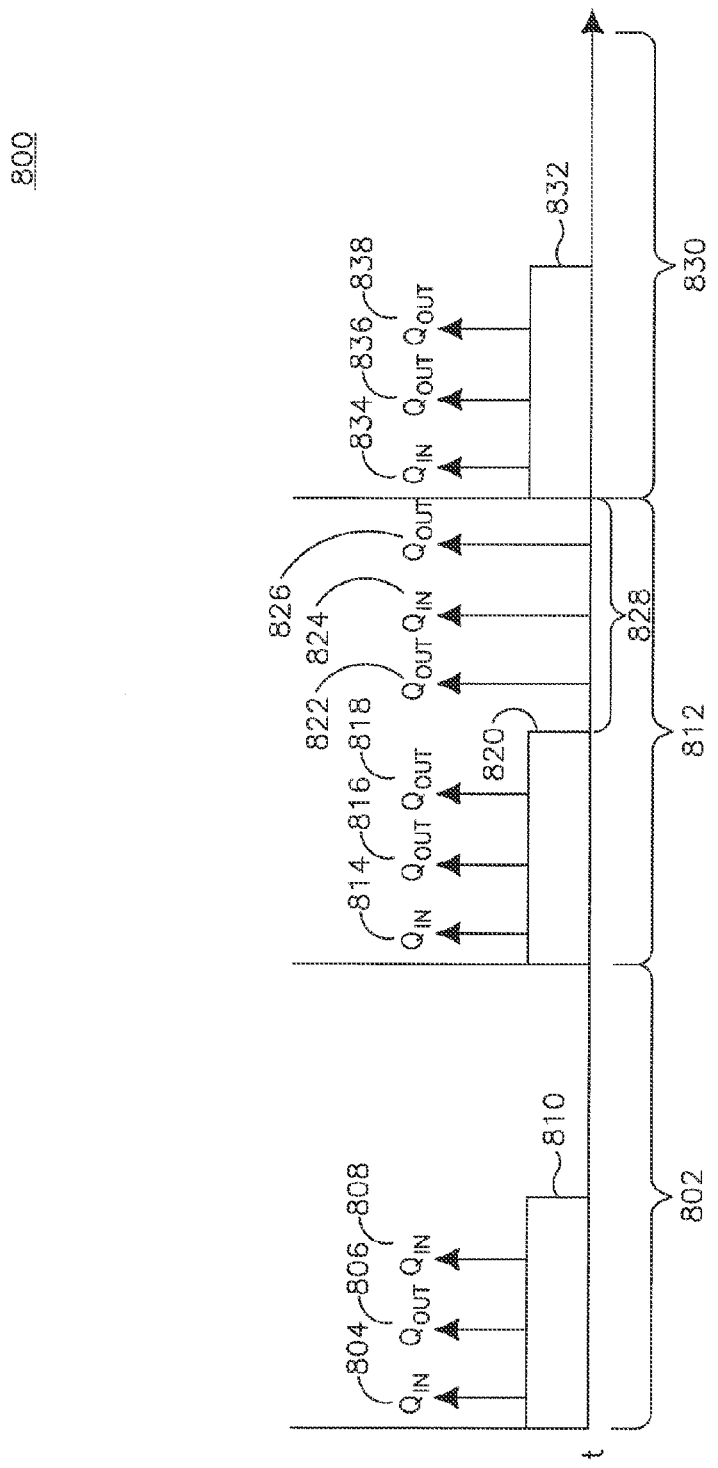
FIG. 8 shows a method of RLF detection in accordance with another embodiment.

FIG. 8 shows a method of RLF detection 800 in accordance with another embodiment. In the first DRX cycle 802, three measurements (804, 806, 808) are taken during the first on-duration 810. During the second DRX cycle, three measurements (814, 816, 818) are taken during the second on-duration 820 and three measurements (822, 824, 826) are taken during the sleep time 828 of the second DRX cycle 812. This may occur due to the detection of three consecutive out-of-synch measurements. In the third DRX cycle 830, during the third on-duration 832, three measurements (834, 836, 838) are taken.

In an alternative embodiment, when the WTRU is in DRX mode, and a particular number of out-of-synch measurements are detected, the WTRU may start a timer for recovery. The WTRU may also continue to make RLF measurements during the sleep time of the DRX cycle. The duration of the recovery measurements may be proportional to the number of in-synch measurements required for radio link recovery or to the duration of a single in-synch measurement. When a predetermined number of Qout measurements are detected, the RLF measurements may be continued into a recovery period, which is a period of time used by the WTRU to determine if the measured results are getting better or remains out-of-synch. If, during the recovery period, the measurements are determined to be in-synch, then the radio link has improved. If not, the WTRU may determine that an RLF has occurred.

The measurements may alternatively continue until the timer expires, as the expiry of the timer indicates a RLF. For example, the number measurements that occur during the sleep time, referred to as "recovery measurements" (Nr) may each have a duration, Dr, with an interval of Tr between measurements, such that Nr×Dr=K×(counter value)×Tin-synch (Equation 1) where K is a predefined constant and Tinsynch is a duration of an in-synch measurement. Furthermore, Tr=timer value/Nr. If Tr is less that or equal to Dr, the recovery measurements occur continuously. The timer value is the allowed time span for a higher layer entity filter to receive a number (counter value) of consecutive in-synch signals from the PHY entity in order to cancel the radio link out-of-sync state before a RLF is determined.

The WTRU may use an out-of-synch counter while in DRX mode. The value of the out-of-synch counter may be dependent upon the RLF timer used in DRX mode and the number of in-synch or out-of-synch indications sent by the PHY entity to the upper layer entities per DRX cycle. For example, the DRX mode out-of-synch counter may equal ((DRX mode timer value)/(DRX cycle length))×(number of indications (Nsigns-L1). The DRX mode timer value may equal the non-DRX mode timer value plus the DRX cycle length.

Nsigns-L1 may be determined by the value of the on-duration timer and the DRX cycle length. For WTRUs with a short DRX cycle length, Nsigns-L1 may equal one (1). For WTRUs with a long DRX cycle length, Nsigns-L1 may equal the long cycle length divided by the short cycle length. For DRX mode, the in-synch counter may be based on the out-of-synch timer plus or minus a constant.

If the WTRU reads reference signal (RS) quality or physical downlink control channel (PDCCH) block error rate (BLER) during the sleep duration, and compares that to an RS quality or PDCCH BLER reading taken before the DRX sleep duration, the WTRU may determine radio link quality and the DRX cycle may have no impact on RLF detection time.

The WTRU may monitor the PDCCH, including decoding the cell radio network temporary identifier (C-RNTI), the system information radio network temporary identifier (SI-RNTI), the paging radio network temporary identifier (P-RNTI) and all other relevant RNTI during the active period of the DRX cycle. The monitoring may be activated if the WTRU detects an out-of-synch measurement in a particular DRX cycle. If the RNTI is decoded successfully, then the PHY entity may transmit an in-synch indication to the higher layer entities. If the decoding of the RNTI fails, due to CRC failure, for example, for a certain number of attempts, then the PHY entity may transmit an out-of-synch indication to the higher layers.

Figure 9:
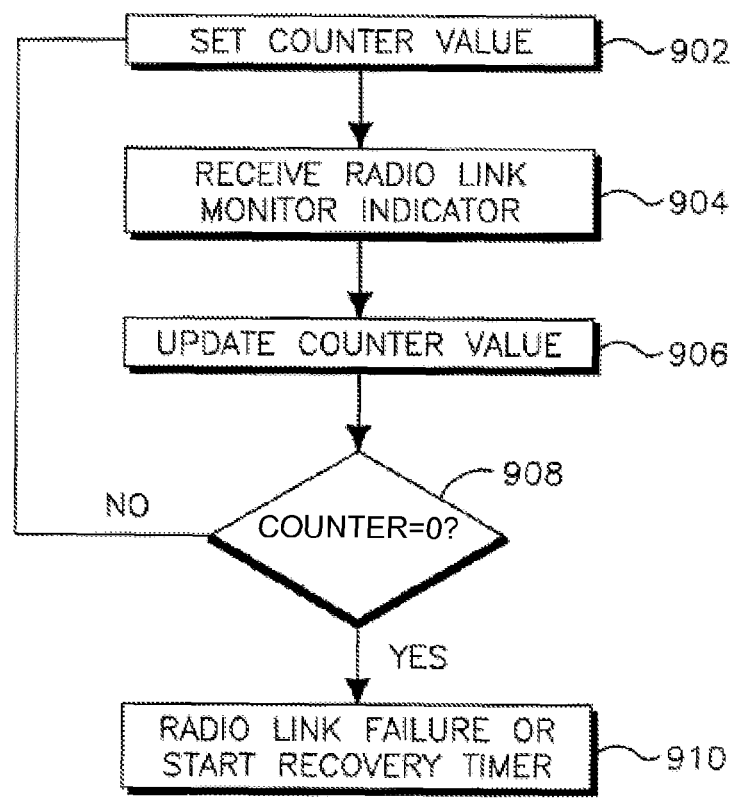
FIG. 9 shows a method of RLF detection in accordance with yet another embodiment.

FIG. 9 shows a method of RLF detection 900 in accordance with yet another embodiment. At step 902, a radio link status counter is set to the value of a parameter such as RADIO_LINK_TIMEOUT. The parameter may be predefined and is related to the number of out-of-synch signals required for the WTRU to determine RLF. At step 904, a higher layer entity filter receives a radio link monitor indicator and at step 906 the radio link status counter is updated according to the values in TABLE 1. At step 908, which occurs at each DRX cycle, the WTRU reads the radio link status counter. If the radio link status counter is not equal to zero, the process continues to step 902. If the radio link status counter does equal zero, then at step 910, either the WTRU can determine that RLF has occurred or the WTRU may start a recover timer.

TABLE 1

| No | RL Monitoring Sign | DPCCH Monitoring Sign | Update value to the "radio link status counter" |
|---|---|---|---|
| 1 | InSync | Success | +2 |
| 2 | InSync | Failure | 0 |
| 3 | InSync | No-sign | +1 |
| 4 | OutSync | Success | 0 |
| 5 | OutSync | Failure | −2 |
| 6 | OutSync | No-sign | −1 |

TABLE 1 may be modified by giving more or less weight to a measurement or giving more or less weight to the DPCCH monitoring sign. Furthermore, in order for the WTRU to obtain a consistent estimated PDCCH BLER, the PDCCH BLER may be based on the shortest PDCCH format or the largest aggregation level.

For radio link recovery, i.e. when ($N<N_{RLF\text{-}durations}$) out-of-sync instances are reported, the WTRU may require $N_{RLF\text{-}durations}$ or a number slightly smaller than $N_{RLF\text{-}durations}$, of in-sync instances to recover the link.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of determining radio link failure (RLF) in a wireless transmit receive unit (WTRU), the method comprising:
    performing a series of radio link measurements in discontinuous reception (DRX) mode;
    detecting a predetermined number of consecutive out-of-synch conditions based on the series of radio link measurements;
    starting a timer upon detecting the predetermined number of consecutive out-of-synch conditions; and
    while operating in DRX mode, continuing the series of radio link measurements using an evaluation period corresponding to non-DRX mode until an expiry or a stop of the timer, wherein the timer is stopped upon detecting a predetermined number of consecutive in-synch conditions based on the continued series of radio link measurements.

2. The method as in claim 1, further comprising:
    determining that the timer has expired; and
    determining that a radio link failure has been detected.

3. The method as in claim 1 further comprising:
    determining a number of measurements for the series of radio link measurements.

4. The method as in claim 1, further comprising
    determining a number of measurements during the sleep-time based on a duration of the measurements, a duration of an in-synch measurement, a counter value and a constant.

5. The method as in claim 1 further comprising the WTRU determining reference signal quality to determine a radio link failure.

6. The method as in claim 1 further comprising the WTRU determining a block error rate of a downlink channel to determine a radio link failure.

7. The method as in claim 6 further comprising the WTRU decoding a radio network temporary identifier (RNTI).

8. The method of claim 1, further comprising:
    determining that a radio link failure has occurred when the timer expires prior to being stopped.

9. A wireless transmit receive unit (WTRU) configured to determine a radio link failure, the WTRU comprising:
    a processor, configured to:
    perform a series of radio link measurements in discontinuous reception (DRX) mode;
    detect a predetermined number of consecutive out-of-synch conditions based on the series of radio link measurements;
    start a timer upon detecting the predetermined number of consecutive out-of-synch conditions; and
    while operating in DRX mode, continue the series of radio link measurements using an evaluation period corresponding to non-DRX mode until an expiry or a stop of the timer, wherein the timer is configured to stop upon detecting a predetermined number of consecutive in-synch conditions based on the continued series of radio link measurements.

10. The WTRU as in claim 9, wherein the processor is further configured to:

determine whether the timer has expired; and determine that a radio link failure has been detected.

11. The WTRU as in claim 9 wherein the processor is further configured to determine a number of measurements for the series of radio link measurements.

12. The WTRU as in claim 11 wherein the processor is further configured to determine a number of measurements during the sleep-time based on a duration of the measurements, a duration of an in-synch measurement, a counter value and a constant.

13. The WTRU as in claim 9 wherein the processor is further configured to determine a reference signal quality to determine a radio link failure.

14. The WTRU as in claim 9 further comprising the WTRU determining a block error rate of a downlink channel to determine a radio link failure.

15. The WTRU as in claim 14 further comprising the WTRU decoding a radio network temporary identifier (RNTI).

16. The WTRU in claim 9, wherein the processor is further configured to determine that a radio link failure has occurred when the timer expires prior to being stopped.

* * * * *

UNITED STATES PATENT AND TRADEMARK OFFICE
Certificate

Patent No. 8,351,922 B2                                                  Patented: January 8, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joseph S. Levy, Merrick, NY (US); Charles A. Dennean, Melville, NY (US); Stephen E. Terry, Northport, NY (US); Peter S. Wang, East Setauket, NY (US); Ulises Olvera-Hernandez, Kirkland (CA); Paul Marinier, Brossard (CA); Jean-Louis Gauvreau, La Prairie (CA); Guodong Zhang, Syosset, NY (US); and Shankar Somasundaram, London (GB).

Signed and Sealed this Ninth Day of July 2013.

<div style="text-align:right">

RAFAEL PÉREZ-GUTIÉRREZ
*Supervisory Patent Examiner*
Art Unit 2642
Technology Center 2600

</div>